United States Patent [19]

Iizuka

[11] Patent Number: 5,192,816
[45] Date of Patent: Mar. 9, 1993

[54] PIPE INNER SURFACE COATING COMPOSITION

[75] Inventor: Hiroshi Iizuka, Sodegaura, Japan

[73] Assignee: Mitsui Petrochemical Industries, Ltd., Tokyo, Japan

[21] Appl. No.: 799,133

[22] Filed: Nov. 27, 1991

[30] Foreign Application Priority Data

Nov. 29, 1990 [JP] Japan .................................. 2-331502

[51] Int. Cl.$^5$ ............................................. C08L 63/00
[52] U.S. Cl. .................................... 523/463; 523/466; 524/435
[58] Field of Search ................. 523/463, 466; 524/435

[56] References Cited

U.S. PATENT DOCUMENTS 5,081,168 1/1992 Edwards et al. .................... 523/466

FOREIGN PATENT DOCUMENTS 57-051737  3/1982  Japan .................................. 523/463
57-202340  12/1982  Japan .................................. 523/463

OTHER PUBLICATIONS

"Handbook of Epoxy Resins", Lee, H. et al., 1967, Gr. 143 TP 1180. E6 14 c.6.

Primary Examiner—John C. Bleutge
Assistant Examiner—D. E. Aylward
Attorney, Agent, or Firm—Nixon & Vanderhye

[57] ABSTRACT

A curable component composed of (A) an epoxy resin containing at least 90% by weight of a bisphenol glycidyl ether and (B) an aliphatic polyamine is blended with (C) 1-xylyl-1,3-diphenylbutane, bis(α-methylbenzyl)xylene, and/or 1-xylyl-1-(3-α-methylbenzylphenyl)ethane, and (D) a coloring pigment and/or an inorganic filler to form a coating composition adapted to be coated to the inner surface of pipes through which city water passes. The composition is cured to the pipe inner surface to form a film which provides a chlorine take-up of up to 1 ppm from city water flowing in contact with the film.

7 Claims, No Drawings

PIPE INNER SURFACE COATING COMPOSITION

This invention relates to an epoxy resin coating composition adapted to be coated to the inner surface of water supply pipes.

BACKGROUND OF THE INVENTION

In general, water supply pipes used in buildings are often provided on the inner surface with coatings for the purposes of preventing corrosion and improving durability. If water supply pipes are corroded on the inner surface, red rust build-up resulting from corrosion would restrict water flow and in extreme cases, leakage could occur. Therefore, water supply pipes are coated on the inner surface upon installation or renewal.

In the prior art, various two-part epoxy coating compositions were used for the water supply pipe coating purpose. They are generally prepared by blending an epoxy resin containing at least 10% by weight of a reactive diluent with a polyamine curing agent, blending the resulting curable resin component with at least 5% by weight of a non-reactive compound such as benzyl alcohol, and further with a coloring pigment and an inorganic filler. The epoxy resin and the polyamine curing agent are mixed such that 1.1 to 0.9 equivalent of active hydrogen of the polyamine is present per equivalent of epoxy group. See Kakiuchi Hiroshi, "New Epoxy Resins", Shokodo, 1988.

The conventional coating compositions have the problems that active hydrogen-bearing compounds used as the curing agent consume a substantial amount of chlorine added to city water for sterilization purpose and that uncured resin component gives off odor. Long-term curing and thorough cleaning are often required in order to meet the water quality standard prescribed by the Municipal Water Supply Associate. Then the working period is extended and extra piping is needed to provide water supply over a long period of construction, resulting in increased construction cost and imposing inconvenience to the users.

SUMMARY OF THE INVENTION

Therefore, an object of the present invention is to solve the above-mentioned problems of the prior art and to provide a coating composition adapted to be coated to the inner surface of a pipe through which drinking water passes, having advantages including reduced chlorine consumption, suppressed odor, water quality maintenance, and feasibility of application leading to ease of coating and relatively quick curing.

Another object of the present invention is to provide a coating composition suitable for soft pig coating technique and annular swirl flow coating technique.

According to the present invention, there is provided a coating composition adapted to be coated to the inner surface of a pipe through which city water passes, comprising a curable component composed of (A) an epoxy resin containing at least 90% by weight of a bisphenol glycidyl ether and (B) an aliphatic polyamine compound providing less than one equivalent of active hydrogen per equivalent of the epoxy group in epoxy resin (A), (C) about 3 to about 20 parts by weight per 100 parts by weight of the curable component of at least one member selected from the group consisting of 1-xylyl-1,3-diphenylbutane, bis(α-methylbenzyl)xylene, and 1-xylyl-1-(3-α-methylbenzylphenyl)ethane, and (D) a coloring pigment and/or an inorganic filler. The composition is cured to the pipe inner surface to form a film which comes in contact with city water. The film provides a chlorine consumption or take-up of up to 1 ppm from city water flowing in contact with the film.

In one preferred embodiment, aliphatic polyamine compound (B) is of a cyclic structural formula having at least one active hydrogen and at least two nitrogen atoms in a molecule, and the active hydrogen is present in an amount of 0.5 to 0.9 equivalent per equivalent of the epoxy group in epoxy resin (A).

Preferably, component (B) is at least one selected from the group consisting of isophoronediamine, m-xylylenediamine, cis-type bis(p aminocyclohexyl)methane, 1,3-aminomethylcyclohexane, and m-trimethylxylylenediamine.

Preferably, component (A) and a mixture of components (A) and (C) each have a viscosity of up to 5,000 centipoise at 25° C., and component (B) and a mixture of components (B) and (C) each have a viscosity of up to 8,000 centipoise at 25° C.

Also preferably, the inorganic filler is flake stainless steel, which is desirably surface treated with stearic acid. The flake stainless steel is present in an amount of about 5 to about 90 parts by weight per 100 parts by weight of the curable component.

DETAILED DESCRIPTION OF THE INVENTION

A curable component in the coating composition of the invention is mainly composed of (A) an epoxy resin and (B) an aliphatic polyamine compound.

Epoxy resin (A) contains at least 90% by weight of a glycidyl ether of a bisphenol represented by general formula (I):

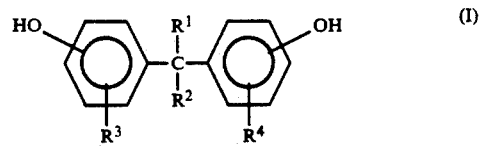

wherein $R^1$, $R^2$, $R^3$, and $R^4$ are independently a hydrogen atom or a $C_1$-$C_4$ alkyl group such as methyl, ethyl, propyl or butyl group.

Bisphenols may be prepared by conventional well-known techniques, for example, by condensing formaldehyde, acetaldehyde or acetone with a substituted or unsubstituted phenol in the presence of an acid. The bisphenols are reacted with epichlorohydrin in the presence of NaOH to form bisphenol glycidyl ethers which are typical epoxy resins.

More particularly, the bisphenols of formula (I), when the phenol nuclei are not substituted, include 2,2-bis(hydroxyphenyl)methane which corresponds to formula (I) and $R^1$ and $R^2$ are hydrogen, 2,2-bis(hydroxyphenyl)ethane which corresponds to formula (I) wherein $R^1$ is hydrogen and $R^2$ is methyl, and 2,2-bis(hydroxyphenyl)propane which corresponds to formula (I) wherein $R^1$ and $R^2$ are methyl, which are known as bisphenol-F, bisphenol-AD, and bisphenol-A, respectively.

Commonly used bisphenols are generally available as a mixture of isomers. For example, bisphenol-F is available as a mixture containing about 10 to 25 mol % of the o-, o'-isomer, about 35 to 60 mol % of the o-, p'-isomer, and about 20 to 50 mol % of the p-, p'-isomer with respect to the position of hydroxyl groups. Bisphenol-AD contains more than about 80 mol % of the p-, p'-isomer with respect to the position of hydroxyl groups. In the case of bisphenol-A, the majority is the p-, p'-isomer, with a minor amount of the o-, o'- and o-, p'-isomers.

Epoxy resins derived from bisphenol-F and bisphenol-AD should preferably have an epoxy equivalent of 165 to 185. Epoxy resins derived from bisphenol-A should preferably have an epoxy equivalent of 185 to 195. An appropriate viscosity is obtained within this epoxy equivalent range.

Preferred among these are bisphenol-F and bisphenol-AD which will form resins having a viscosity of up to 3500 centipoise at 25° C. A mixture which is at least two members selected from the group consisting of bisphenol-A, bisphenol-F and bisphenol-AD may also be available in condition of proper viscosity.

Epoxy resins other than the bisphenol types which are used by mixing with the above described bisphenol types are not particularly limited. For example, epoxy resins derived from 1,6-hexanediol and higher alcohols may be useful by being mixed into epoxy resin (A) in an amount of less than 10% by weight.

Curing agent (B) is an aliphatic polyamine compound. In this invention, the term "an aliphatic polyamine compound" means the compounds which include the following items (1), (2) and (3).

(1) Aliphatic polyamines, such as tetraethylene pentamine and the like.

(2) Cycloaliphatic polymaines, such as isophorone diamine and the like.

(3) Aliphatic polyamines having at least an aromatic ring, such as xylene diamine and the like.

Among these, polyamines having a cyclic structure of items (2) and (3) are preferred.

The aliphatic polyamine compounds may be used alone or in admixture of two or more. Examples include isophoronediamine, m-xylylenediamine, cis-type bis(p-aminocyclohexyl)methane, 1,3-aminomethylcyclohexane, and m-trimethylxylylenediamine. Because pure polyamine compounds are unstable under normal using conditions, it is preferred to use modified materials formed from reaction products of polyamines with other compounds. Preferably, the aliphatic polyamine contains a reaction product with at least one epoxy resin, especially bisphenol-F, -AD or -A type epoxy resin.

Component (B) or aliphatic polyamine compound is mixed with component (A) or epoxy resin such that the ratio in equivalent of active hydrogen in the polyamine compound to epoxy group in the epoxy resin may be less than 1, preferably from 0.5 to 0.9, more preferably from 0.7 to 0.8. This ratio is a calculated active hydrogen equivalent as defined below.

$$\text{Calculated active hydrogen equivalent} = (X + Y + \ldots)/(X/Hx + Y/Hy \ldots)$$

X: amount of modifying amine X
Hx: calculated active hydrogen equivalent of modifying amine X
Y: amount of modifying amine Y
Hy: calculated active hydrogen equivalent of modifying amine Y
Hx and Hy are calculated according to the following equations.

$$Hx = (Wx + We)/\{(Wx/hx) - (We/Ex)\}$$

Wx: amount of amine X
We: amount of epoxy resin
hx: active hydrogen equivalent of amine X
Ex: epoxy equivalent of epoxy resin $$Hy = (Wy + We)/\{(Wy/hy) - (We/Ex)\}$$

Wy: amount of amine Y
We: amount of epoxy resin
hy: active hydrogen equivalent of amine Y
Ex: epoxy equivalent of epoxy resin With the aliphatic polyamine compound blended in the above-defined range, there can be obtained an epoxy resin composition which is cured to the pipe inner surface to form a film which provides a chlorine consumption of up to 1 ppm (mg/liter) from city water flowing in contact with the film and a total organic carbon content (TOC) of up to 5 ppm (mg/liter).

In this invention, the term "a chlorine consumption" means the value of a loss of residual chlorine in accordance with JWWAK 135 (the Japan Water Association) after the following dissolving condition.

A steel pipe (20A) having a nominal inner diameter of 20 mm on the inner surface is coated with a composition by an annular flow coating technique by curing for 24 hours, and then is filled with test water and closed with plugs for 24 hours.

Component (C) is at least one member selected from the group consisting of 1-xylyl-1,3-diphenylbutane, bis-($\alpha$-methylbenzyl)xylene, and 1-xylyl-1-(3-$\alpha$-methylbenzylphenyl)ethane, which is a non-reactive compound to the curable component and is to improve handling properties, film forming properties or the like. One or more members may be used as component (C). A typical example is Nisseki HISOL SAS-LH® commercially available from Nippon Petro-Chemical K.K, which is a mixture of above mentioned three compounds.

Component (C) is used in an amount of about 3 to 20 parts, preferably about 5 to 12 parts by weight per 100 parts by weight of components (A) and (B) combined because cured films as coated provide a minimal chlorine consumption, i.e., up to 1 ppm even when water is passed without any cleaning.

A diluent may be added to the coating composition of the invention. Examples of the diluent having low or high molecular weight include esters such as vegetable oils, higher aliphatic or aromatic alcohols and polyalkylene glycol. Preferred diluents are benzyl alcohol and polypropylene glycol. The diluent is used in an amount of less than about 5 parts by weight per 100 parts by weight of components (A) and (B) combined. Within this range, cured compositions as coated provide a minimal chlorine consumption and little odor even when water is passed without any cleaning. There is no detrimental influence on other water quality factors.

Component (D) which may be added to the coating composition of the present invention is a coloring pigment or an inorganic filler or both.

The coloring pigment is preferably available as fine powder having a mean particle size of less than 1 $\mu$m. Included are inorganic pigments such as titanium oxide, zinc oxide, carbon black, red iron oxide, cadmium red, titanium yellow, chromium oxide green, cobalt green, ultramarine, Prussian blue, cobalt blue, cerulean blue, cobalt violet, and mars violet; and organic pigments such as Permanent Red, Hansa Yellow, Benzidine Yellow, Lake Red, Phthalocyanine Blue, and Phthalocyanine Green. Among these, preference is made to titanium oxide, ultramarine, cobalt blue, Phthalocyanine Blue, Phthalocyanine Green, chromium oxide green, titanium yellow, and red iron oxide because of stability.

Examples of the inorganic filler include metal powder, calcium carbonate, magnesium carbonate, silica, glass powder, glass flakes, glass beads, glass balloons, mica, graphite, barium sulfate, aluminum hydroxide, talc, kaolin, acidic clay, activated clay, bentonite, diatomaceous earth, montmorillonite, and dolomite. Among these, preference is made to calcium carbonate, silica, barium sulfate, talc, and kaolin for hygienic reason since they are available in highly pure form. The fillers preferably have an oil absorption value of at least 11 ml and a mean particle size of up to 150 $\mu$m. The oil absorption value is defined as the volume (ml) of linseed oil absorbed per 100 grams of the inorganic filler.

Component (D) is preferably present in an amount of about 5 to about 90 parts, more preferably about 20 to about 80 parts by weight per 100 parts by weight of the curable component [(A) +(B)]. Within this range, the composition when coated to the pipe inner surface will not sag while firmly adhering thereto.

In addition to the above-mentioned essential components, the coating composition of the invention may contain any desired additives, for example, thixotropic agents, antisugging agent, defoaming agents, and leveling agents. Exemplary are powdery polyethylene oxide, hydrogenated castor oil, colloidal silica, and powdery polyethylene terephthalate. If desired, curing promoters such as tertiary amines and phenol derivatives or phenol resin derivatives may be added. These additives should be up to 5% by weight of the entire composition because their own property can be additionally exerted without detracting from the benefits of the inventive composition.

Flake stainless steel powder is one of the most preferred inorganic fillers because the flake stainless steel filler is effective for controlling the thermal expansion of the composition and thus improving thermal impact and thermal resistance. Flake stainless steel is available in various forms, preferab of about 20 to 300 $\mu$m, especially about 20 to 200 $\mu$m, a breadth of about 20 to 300 $\mu$m, especially about 20 to 150 $\mu$m, and a thickness of up to about 10 $\mu$m, especially up to about 5 $\mu$m. The type of material need not be limited insofar as it belongs to well-known stainless steel. Flake stainless steel is preferably surface treated with stearic acid because stearic acid is effective for preventing the heavier stainless steel flakes from settling in the composition so that stainless steel flakes are uniformly dispersed in the composition in good orientation. It is commercially available as STS-200 from Fukuda Metal K.K., for example.

Flake stainless steel as the inorganic filler is preferably blended in the coating composition of the invention in an amount of about 5 to about 90 parts more preferably 20 to 80 parts by weight per 100 parts by weight of the curable component, components (A) and (B) combined. Within this range, the coating composition before curing has an appropriate viscosity to ensure efficient operation when it is applied by an annular flow coating technique using high velocity air flow, and the cured composition is fully resistant against thermal impact.

The coating composition of the invention is generally formulated as a two-part composition consisting of an epoxy resin component and a curing agent component. For example, component (A) or epoxy resin is blended with component (D) or pigment and/or filler to form a primary part. Component (B) or curing agent is blended with component (D) or pigment and/or filler to form a curing agent part. Component (C) may be added to either of the two parts. On use, the two parts are mixed in a predetermined ratio to obtain a curable composition.

The coating composition of the invention is advantageously applied to the inner surface of a pipe by a so-called annular flow coating technique, that is, by blowing gas flow through the pipe while carrying the coating composition, thereby forcing the composition to adhere the pipe inner surface. In order that the annular flow coating technique be applicable, component (A) alone and a mixture of components (A) and (C) each should preferably have a viscosity of up to 5,000 centipoise (=5 Pa.s) at 25° C., especially up to 3,500 centipoise at 25° C., and component (B) alone and a mixture of components (B) and (C) each have a viscosity of up to 8,000 centipoise at 25° C., especially up to 6,500 centipoise at 25° C. Further, the composition as a whole should preferably have a viscosity of 7,000 to 60,000 centipoise at 25° C., especially 10,000 to 40,000 centipoise at 25° C.

The viscosity is measured after 2 minutes from the starting of rotating at 25° C. by means of a BL type viscometer with rotor No. 4 at 30 rpm in accordance with JIS K 6838. When more than 20,000 centipoise, the viscosity is measured at more than 25° C. and calibrated by the previously prepared temperature-viscosity relation curve.

More preferably, the coating composition should meet the requirements described in Japanese Patent Application Kokai No. 184083/1989.

Curing operation of the coating composition of the invention generally takes place at a temperature of 5° C or higher, preferably 15° C or higher for about 16 to about 28 hours. Usually, the composition is cured simply by allowing it to stand after coating. If it is desired to accelerate curing reaction, hot water or hot gas may be passed through the pipe as described in Japanese Patent Application Kokai (Japanese Patent Application Laid-Open) Nos. 83174/1988 and 283784/1988. Hot water is also effective for cleaning the cured film.

EXAMPLE

Examples of the present invention are given below by way of illustration and not by way of limitation. All parts are by weight.

Example 1

A primary component (I) and a curing component (II) were prepared in accordance with the following formulations. The two components were mixed to form a coating composition within the scope of the invention.

The primary component (I) was prepared by blending 100 parts of bisphenol-AD type epoxy resin (viscosity 2850 centipoise at 25° C., epoxy equivalent 173) with 7.5 parts of a mixture of 1-xylyl-1,3-diphenylbutane, bis($\alpha$-methylbenzyl)-xylene, and 1-xylyl-1-(3-$\alpha$-methylbenzylphenyl)ethane. The blend had a viscosity of 2720 centipoise at 25° C. To the blend were added 1.5 parts of p-hydroxy benzoate, 2.3 parts of a mixture of wax with high purity fine powder silica, 15.2 parts of titanium oxide, and 25 parts of talc. The blend was further milled in a three-roll mill, completing the primary component (I) which had a viscosity of about 30,000 centipoise at 25° C.

The curing component (II) was prepared by blending 100 parts of a curing agent obtained by reacting 1 mol of isophoronediamine with 0.31 gram-equivalent of a bisphenol-AD type epoxy resin (viscosity 2850 centipoise at 25° C., epoxy equivalent 173) with 20.5 parts of a mixture of 1-xylyl-1,3-diphenylbutane, bis($\alpha$-methylbenzyl)xylene, and 1-xylyl-1-(3-$\alpha$-methylbenzylphenyl)ethane. The blend had a viscosity of 6200 centipoise at 25° C. To the blend were added 12 parts of benzyl alcohol as a diluent, 2 parts of wax, 2.5 parts of cobalt blue, 12.6 parts of talc, and 123 parts of calcium carbonate. The blend was further milled in a three-roll mill, completing the curing component (II) which had a viscosity of about 30,000 centipoise at 25° C.

The primary and curing components were mixed in a weight ratio of primary/curing component of 100/50 to form a coating composition. It is to be noted that the mixing ratio of the curing agent relative to the epoxy resin corresponded to a calculated active hydrogen equivalent of 79.3%.

Example 2

A primary component (I) and a curing component (II) were prepared in the same manner as in Example 1. The two components were mixed to form a coating composition within the scope of the invention. Particularly, the primary and curing components were mixed in a weight ratio of primary/curing component of 100/44 to form a coating composition. The mixing ratio of the curing agent relative to the epoxy resin corresponded to a calculated active hydrogen equivalent of 69.8%.

Example 3

A primary component (I) and a curing component (II) were prepared in the same manner as in Example 1. The two components were mixed to form a coating composition within the scope of the invention. Particularly, the primary and curing components were mixed in a weight ratio of primary/curing component of 100/37.8 to form a coating composition. The mixing ratio of the curing agent relative to the epoxy resin corresponded to a calculated active hydrogen equivalent of 60%.

Example 4

A primary component (I) and a curing component (II) were v prepared in accordance with the following formulations. The two components were mixed to form a coating composition within the scope of the invention.

The primary component (I) was prepared by the same procedure as in Example 1 except that the bisphenol-AD type epoxy resin was replaced by bisphenol-F type epoxy resin (viscosity 3510 centipoise at 25° C, epoxy equivalent 173). The blend of bisphenol-F type epoxy resin and component (C) had a viscosity of 2850 centipoise at 25° C. The resultant primary component had a viscosity of about 30,000 centipoise at 25° C.

The curing component (II) was the same as in Example 1.

The primary and curing components were mixed in a weight ratio of primary/curing component of 100/50 to form a coating composition. The mixing ratio of the curing agent relative to the epoxy resin corresponded to a calculated active hydrogen equivalent of 79.3%.

Example 5

A primary component (I) and a curing component (II) were prepared in accordance with the following formulations. The two components were mixed to form a coating composition within the scope of the invention.

The primary component (I) was prepared by blending 100 parts of bisphenol-A type epoxy resin (viscosity 12,800 centipoise at 25° C, epoxy equivalent 189) and 122.6 parts of bisphenol-F type epoxy resin (viscosity 3,510 centipoise at 25° C., epoxy equivalent 173) with 16 parts of a mixture of 1-xylyl- 1,3-diphenylbutane, bis($\alpha$-methylbenzyl)xylene, and 1-xylyl-1-(3-$\alpha$-methylbenzylphenyl)ethane. The blend had a viscosity of 4950 centipoise at 25° C. To the blend were added 3.2 parts of p-phydroxy benzoate, 4.8 parts of a mixture of wax with high purity fine powder silica, 32.5 parts of titanium oxide, and 43.5 parts of barium sulfate. The blend was further milled in a three-roll mill, completing the primary component (I) which had a viscosity of about 35,000 centipoise at 25° C.

The curing component (II) was prepared by blending 100 parts of a curing agent obtained by reacting 1 mol of isophoronediamine with 0.291 gram-equivalent of a bisphenol-A type epoxy resin (viscosity 12,800 centipoise at 25° C., epoxy equivalent 189) with 20.5 parts of a mixture of 1-xylyl-1,3-diphenylbutane, bis($\alpha$-methylbenzyl)xylene, and 1-xylyl-1-(3-$\alpha$-methylbenzylphenyl)ethane. The blend had a viscosity of 6250 centipoise at 25° C. To the blend were added 12 parts of a benzyl alcohol, 2 parts of wax, 2.5 parts of cobalt blue, 12.6 parts of talc, and 102.9 parts of calcium carbonate. The blend was further milled in a three-roll mill, completing the curing component (II) which had a viscosity of about 30,000 centipoise at 25° C.

The primary and curing components were mixed in a weight ratio of primary/curing component of 100/46.4 to form a coating composition. The mixing ratio of the curing agent relative to the epoxy resin corresponded to a calculated active hydrogen equivalent of 79.2%.

Example 6

A primary component (I) and a curing component (II) were prepared in accordance with the following formulations. The two components were mixed to form a coating composition within the scope of the invention.

The primary component (I) was prepared by blending 100 parts of bisphenol-F type epoxy resin (viscosity 3500 centipoise at 25° C., epoxy equivalent 175) with 7.5 parts of a mixture of 1-xylyl-1,3-diphenylbutane, bis($\alpha$-methylbenzyl)-xylene, and 1-xylyl-1-(3-$\alpha$-methylbenzylphenyl)ethane. The blend had a viscosity of 2850 centipoise at 25° C. To the blend were added 1.5 parts of p-hydroxy benzoate, 2.3 parts of a mixture of wax with high purity fine powder silica, 15.2 parts of titanium oxide, 20.5 parts of calcium carbonate, and 4.5 parts of barium sulfate. The blend was further milled in a three-roll mill, completing the primary component (I) which had a viscosity of about 30,000 centipoise at 25° C.

The curing component (II) was prepared by blending 100 parts of a curing agent obtained by reacting 1 mol of m-xylenediamine with 0.417 gram-equivalent of a bisphenol-F type epoxy resin (viscosity 3500 centipoise at 25° C., epoxy equivalent 175) and 24.7 parts of a curing agent obtained by reacting 1 mol of isophoronediamine with 0.256 gram-equivalent of a bisphenol-A type epoxy resin (viscosity 12,800 centipoise at 25° C, epoxy equivalent 189) with 26.8 parts of a mixture of 1-xylyl-1,3-diphenylbutane, bis(α-methylbenzyl)xylene, and 1-xylyl-1-(3-α-methylbenzylphenyl)ethane. The blend had a viscosity of 3650 centipoise at 25° C. To the blend were added 18.2 parts of benzyl alcohol, 2.3 parts of wax, 3 parts of cobalt blue, 15.2 parts of talc, and 113.9 parts of calcium carbonate. The blend was further milled in a three-roll mill, completing the curing component (II) which had a viscosity of about 30,000 centipoise at 25° C.

The primary and curing components were mixed in a weight ratio of primary/curing component of 100/43 to form a coating composition. The mixing ratio of the curing agent relative to the epoxy resin corresponded to a calculated active hydrogen equivalent of 79.9%.

Example 7

A primary component and a curing component were prepared in accordance with the following formulations. The two components were mixed to form a coating composition within the scope of the invention.

The primary component (I) was prepared by blending 100 parts of bisphenol-AD type epoxy resin (viscosity 2850 centipoise at 25° C., epoxy equivalent 173) with 7.5 parts of a mixture of 1-xylyl-1,3-diphenylbutane, bis(α-methylbenzyl)-xylene, and 1-xylyl-1-(3-α-methylbenzylphenyl)ethane. The blend had a viscosity of 2720 centipoise at 25° C. To the blend were added 1.5 parts of p-hydroxy benzoate, 2.3 parts of a mixture of wax with high purity fine powder silica, 15.2 parts of titanium oxide, and 25 parts of calcium carbonate. The blend was further milled in a three-roll mill, completing the primary component (I) which had a viscosity of about 30,000 centipoise at 25° C.

The curing component (II) was prepared by blending 100 parts of a curing agent obtained by reacting 1 mol of m-xylenediamine with 0.5 gram-equivalent of a bisphenol-F type epoxy resin (viscosity 3500 centipoise at 25° C., epoxy equivalent 175) and 67.6 parts of a curing agent obtained by reacting 1 mol of cis-type bis(p-aminocyclohexyl)methane with 0.202 gram-equivalent of a bisphenol-AD type epoxy resin (viscosity 2850 centipoise at 25° C, epoxy equivalent 173) with 34.2 parts of a mixture of 1-xylyl-1,3-diphenylbutane, bis(α-methylbenzyl)xylene, and 1-xylyl-1-(3-α-methylbenzylphenyl)-ethane. The blend had a viscosity of 4820 centipoise at 25° C. To the blend were added 21.4 parts of benzyl alcohol, 3 parts of p-hydroxy benzoate, wax and high purity fine powder silica, 4.3 parts of cobalt blue, and 197.5 parts of calcium carbonate. The blend was further milled in a three-roll mill, completing the curing component (II) which had a viscosity of about 30,000 centipoise at 25° C.

The primary and curing components were mixed in a weight ratio of primary/curing component of 100/50 to form a coating composition. The mixing ratio of the curing agent relative to the epoxy resin corresponded to a calculated active hydrogen equivalent of 80%.

Comparative Example 1

A primary component and a curing component were prepared in accordance with the following formulations. The two components were mixed to form a coating composition outside the scope of the invention.

The primary component (I) was prepared by blending 100 parts of bisphenol-A type epoxy resin (viscosity 12,800 centipoise at 25° C., epoxy equivalent 189) and 43.7 parts of bisphenol-F type epoxy resin (viscosity 3,500 centipoise at 25° C., epoxy equivalent 174) and 10.4 parts of 1-phenyl-1-xylylethane. The blend had a viscosity of 8,000 centipoise at 25° C. To the blend were added 2.1 parts of p-hydorxy benzoate, 3.1 parts of a mixture of wax with high purity fine powder silica, 21 parts of titanium oxide, and 28 parts of barium sulfate. The blend was further milled in a three-roll mill, completing the primary component (I) which had a viscosity of about 30,000 centipoise at 25° C.

The curing component (II) was prepared by blending 100 parts of a curing agent obtained by reacting 1 mol of isophoronediamine with 0.291 gram-equivalent of a bisphenol-A type epoxy resin (viscosity 12,800 centipoise at 25° C., epoxy equivalent 189). The thus obtained curing agent had a viscosity of 10,000 centipoise at 25° C. To the curing agent was added 20.5 parts of 1-phenyl-1-xylylethane to obtain a blend having a viscosity of 5,500 centipoise. To the blend were further added 12 parts of a benzyl alcohol, 2 parts of wax, 2.5 parts of cobalt blue, 12.6 parts of talc, and 102.9 parts of calcium carbonate. The blend was further milled in a three-roll mill, completing the curing component which had a viscosity of about 30,000 centipoise at 25° C.

The primary and curing components (II) were mixed in a weight ratio of primary/curing component of 100/50 to form a coating composition. The mixing ratio of the curing agent relative to the epoxy resin corresponded to a calculated active hydrogen equivalent of 87%.

Comparative Example 2

A primary component (I) and a curing component (II) were prepared in accordance with the following formulations. The two components were mixed to form a coating composition outside the scope of the invention.

The primary component (I) was prepared by blending 100 parts of bisphenol-A type epoxy resin (viscosity 12,800 centipoise at 25° C., epoxy equivalent 189) and 43.7 parts of bisphenol-F type epoxy resin (viscosity 3,500 centipoise at 25° C., epoxy equivalent 174) with 10.4 parts of hexanediol diglycidyl ether (viscosity 20 centipoise at 25° C, epoxy equivalent 145). The blend had a viscosity of 3,900 centipoise at 25° C. To the blend were added 2.1 parts of p-hydroxy benzoate, 3.1 parts of a mixture of wax with high purity fine powder silica, 21 parts of titanium oxide, and 28 parts of barium sulfate. The blend was further milled in a three-roll mill, completing the primary component (I) which had a viscosity of about 30,000 centipoise at 25° C.

The curing component (II) was prepared by blending 100 parts of a curing agent obtained by reacting 1 mol of isophoronediamine with 0.256 gram-equivalent of a bisphenol-A type epoxy resin (viscosity 12,800 centipoise at 25° C., epoxy equivalent 189). The blend had a viscosity of 4,400 centipoise at 25° C. To the blend were added 25 parts of benzyl alcohol, 4 parts of a mixture of wax with high purity fine powder silica, 2 parts of cobalt blue, and 63.4 parts of talc. The blend was further milled in a three-roll mill, completing the curing component (II) which had a viscosity of about 30,000 centipoise at 25° C.

The primary and curing components were mixed in a weight ratio of primary/curing component of 100/47.9 to form a coating composition. The mixing ratio of the curing agent relative to the epoxy resin corresponded to a calculated active hydrogen equivalent of 100%.

Comparative Example 3

A primary component (I) and a curing component (II) were prepared in the same manner as in Comparative Example 2. The two components were mixed to form a coating composition outside the scope of the invention. Particularly, the primary and curing components were mixed in a weight ratio of primary/curing component of 100/38.3 to form a coating composition. The mixing ratio of the curing agent relative to the epoxy resin corresponded to a calculated active hydrogen equivalent of 80%.

Comparative Example 4

A primary component (I) and a curing component (II) were prepared in accordance with the following formulations. The two components were mixed to form a coating composition outside the scope of the invention.

The primary component (I) was prepared by blending 100 parts of bisphenol A type epoxy resin (viscosity 12,800 centipoise at 25° C., epoxy equivalent 189) and 98.4 parts of bisphenol-AD type epoxy resin (viscosity 2,850 centipoise at 25° C., epoxy equivalent 173) with 34.9 parts of hexanediol diglycidyl ether (viscosity 20 centipoise at 25° C., epoxy equivalent 145). The blend had a viscosity of 1,420 centipoise at 25° C. To the blend were added 6.3 parts of a mixture of wax with high purity fine powder silica, 47.6 parts of titanium oxide, and 33.4 parts of talc. The blend was further milled in a three-roll mill, completing the primary component (I) which had a viscosity of about 30,000 centipoise at 25° C.

The curing component (II) was prepared by blending 100 parts of a curing agent obtained by reacting 1 mol of m-xylenediamine with 0.423 gram-equivalent of a bisphenol A type epoxy resin (viscosity 12,800 centipoise at 25° C., epoxy equivalent 189). The blend had a viscosity of 9,400 centipoise at 25° C. To the blend were added 17.7 parts of benzyl alcohol, 3.9 parts of high purity fine powder silica, 2 parts of cobalt blue, 7 parts of talc, and 66.9 parts of calcium carbonate. The blend was further milled in a threeroll mill, completing the curing component (II) which had a viscosity of about 30,000 centipoise at 25° C.

The primary and curing components were mixed in a weight ratio of primary/curing component of 100/50 to form a coating composition. The mixing ratio of the curing agent relative to the epoxy resin corresponded to a calculated active hydrogen equivalent of 100%.

Test 1

The pipe inner surface coating compositions of Examples 1-7 and Comparative Examples 1-4 were coated and cured into films which were examined by several tests.

More particularly, a steel pipe (20A) having a nominal inner diameter of 20 mm on the inner surface was polished by sand blasting. The pipe on the inner surface was coated with the composition by an annular flow coating technique by blowing dry air through the pipe at a velocity of 100 m/sec. The internally coated pipe was allowed to stand for 24 hours at 20° C. or 10° C., curing the film.

(1) Dissolving test: The internally coated pipe was cleaned by passing city water for 30 minutes or 2 hours and then washed with test water prepared in accordance with the test water preparation method JWWAK 135 (the Japan Water Association). Once the pipe was emptied, it was filled with test water again and closed with plugs. The pipe filled with test water was allowed to stand for 24 hours at 20° C. or 10° C.

(2) The test water was taken out of the pipe and examined for a loss of residual chlorine and odor in accordance with JWWAK 135 (the Japan Water Association).

The results are shown in Table 1.

TABLE 1

| Example | Curing temp. & Dissolving test temp. | Loss of residual chlorine | Odor |
| --- | --- | --- | --- |
| E1 | 20° C. | 0.6 ppm | normal |
| E2 | 20° C. | 0.6 ppm | normal |
| E3 | 20° C. | 0.6 ppm | normal |
| E4 | 20° C. | 0.7 ppm | normal |
| E5 | 20° C. | 0.6 ppm | normal |
| CE1 | 20° C. | >1 ppm | chemical odor |
| CE2 | 20° C. | >1.8 ppm | chemical odor |
| CE3 | 20° C. | >1.8 ppm | chemical odor |
| E6 | 10° C. | 0.7 ppm | normal |
| E7 | 10° C. | 0.7 ppm | normal |
| CE4 | 10° C. | >1.5 ppm | chemical odor |

* ppm = mg/liter
Normal: not detected any chemical odor

Test 2

The compositions of Examples 1 and 6 were coated to glass plates according to JWWAK 135 (the Japan Water Association), cured at 23° C., and subjected to a leaching test according to JWWAK 135.

The water test results are shown in Table 2.

TABLE 2

| Criteria | Example 1 | Example 6 |
| --- | --- | --- |
| Turbidity | 0° | 0° |
| chromaticity | 0° | 0° |
| Potassium permanganate consumption | <0.5 ppm | <0.5 ppm |
| Loss of residual chlorine | 0.3 ppm | 0.3 ppm |
| Odor | normal | normal |
| Taste | normal | normal |
| Cyan | not detected | not detected |
| Phenols | <0.005 ppm | <0.005 ppm |
| Amines | not detected | not detected |
| Epichlorohydrin | not detected | not detected |
| Toluenediisocyanate | not detected | not detected |
| Pass/Fail | pass | pass |

Example 8

A primary component and a curing component were prepared in accordance with the following formulations. The two components were mixed to form a coating composition within the scope of the invention.

The primary component was prepared by blending 100 parts of bisphenol-AD type epoxy resin (viscoisty 2850 centipoise at 25° C., epoxy equivalent 173), 7.5 parts of a mixture of 1-xylyl-1,3-diphenylbutane, bis (α-methylbenzyl)xylene, and 1-xylyl- 1-(3-α-methylbenzylphenyl)ethane. The blend had a viscosity of 2720 centipoise at 25° C. To the blend were added 1.5 parts of p-hydroxy benzoate, 2.3 parts of a mixture of wax with high purity fine powder silica, and 40.2 parts of flake stainless steel. The blend was further milled in vacuum, completing the primary component which had a viscosity of about 30,000 centipoise at 25° C.

The curing component was the same as in Example 1.

The primary and curing components were mixed in a weight ratio of primary/curing component of 100/50 to form a coating composition. The amount of flake stainless steel added was 31.5 parts per 100 parts of the curable resin. The mixing ratio of the curing agent relative to the epoxy resin corresponded to a calculated active hydrogen equivalent of 79.3%.

Example 9

A primary component and a curing component were prepared in accordance with the following formulations. The two components were mixed to form a coating composition within the scope of the invention.

The primary component (I) was prepared by blending 100 parts of bisphenol-AD type epoxy resin (viscosity 2850 centipoise at 25° C., epoxy equivalent 173) with 1.5 parts of a mixture of 1-xylyl-1,3-diphenylbutane, bis($\alpha$-methylbenzyl)-xylene, and 1-xylyl-1-(3-$\alpha$-methylbenzylphenyl)ethane. The blend had a viscosity of 2820 centipoise at 25° C. To the blend were added 2.3 parts of a mixture of wax with high purity fine powder silica, and 47.7 parts of flake stainless steel. The blend was further milled in vacuum, completing the primary component (I) which had a viscosity of about 30,000 centipoise at 25° C.

The curing component (II) was prepared by blending 100 parts of a curing agent obtained by reacting 1 mol of isophoronediamine with 0.291 gram-equivalent of a bisphenol-A type epoxy resin (viscosity 12,800 centipoise at 25° C., epoxy equivalent 189), 20.5 parts of a mixture of 1-xylyl-1,3-diphenylbutane, bis($\alpha$-methylbenzyl)xylene, and 1-xylyl-1-(3-$\alpha$-methylbenzylphenyl)ethane. The blend had a viscosity of 6250 centipoise at 25° C. To the blend were added 12 parts of a benzyl alcohol, 1.6 parts of wax, 34.7 parts of talc, and 103.7 parts of flake stainless steel. The blend was further milled in vacuum, completing the curing component (II) which had a viscosity of about 30,000 centipoise at 25° C.

The primary and curing components were mixed in a weight ratio of primary/curing component of 100/50 to form a coating composition. The amount of flake stainless steel added was 60 parts per 100 parts of the curable resin.

Test 3

The pipe inner surface coating compositions of Examples 8–9 and Comparative Example 1 were coated and cured into films which were examined by the following test.

More particularly, a steel pipe (100A) having a nominal inner diameter of 100 mm on the inner surface was polished by sand blasting. The pipe on the inner surface was coated with the composition by an annular flow coating technique by blowing dry air through the pipe at a velocity of 100 m/sec.

The coating was cured by allowing the internally coated pipe to stand in air for 24 hours at an average temperature of 20° C., and passing warm water at 50° C. through the pipe for 30 minutes, and then hot water at 70° C. for 60 minutes.

A thermal cycling test was carried out on the pipe having the film cured in this way, by repeating cycles of passing hot water at 70° C. for 10 minutes and then city water below 25° C for 10 minutes. The film was observed at intervals. The results are shown in Table 3.

The films obtained from the compositions of Examples 8 and 9 were also examined for a loss of residual chlorine and odor by the JWWAK 135 method as in Test 1 at a dissolving test temperature of 20° C. For both the films, the loss of residual chlorine was less than 0.7 ppm and no odor was perceived.

TABLE 3

| Cycle | E 8 | E 9 | CE 1 |
|---|---|---|---|
| 2160 | unchanged | unchanged | some cracks on weld line |
| 3600 | unchanged | unchanged | circumferential crazing |
| 17000 | unchanged | unchanged | partial lifting |

As seen from the foregoing test results, the pipe inner surface coating compositions within the scope of the invention provide cured films which are improved in loss of residual chlorine and odor over the prior art coating compositions while offering acceptable results in other water quality evaluations. The coating compositions, when loaded with flake stainless steel as an inorganic filler, provide cured films having improved thermal impact property or strength.

There has been described a pipe inner surface coating composition comprising a curable component composed of (A) an epoxy resin containing a large content of a bisphenol glycidyl ether and a specific amount of an aliphatic polyamine curing agent, and at least one member selected from the group consisting of 1-xylyl-1,3-diphenylbutane, bis($\alpha$-methylbenzyl)-xylene, and 1-xylyl-1-(3-$\alpha$-methylbenzylphenyl)ethane. This epoxy resin coating composition is useful in coating the inner surface of water supply pipes, for example, pipes for carrying warm or hot water fed through water heaters and hot water tanks or boilers as well as city water. It can be applied to the pipe inner surface by an annular swirl flow coating technique or soft pig coating technique. It cures into films which are improved in water quality maintenance. Particularly when loaded with flake stainless steel as an inorganic filler, the coating composition provides cured films having improved thermal impact property or strength. The coating composition is efficient and easy to coat to the inner surface of water supply pipes, with an attendant advantage of shortening the working period required for the renewal of used pipes.

Although some preferred embodiments have been described, many modifications and variations may be made thereto in the light of the above teachings. It is therefore to be understood that within the scope of the appended claims, the invention may be practiced otherwise than as specifically described.

I claim:

1. A coating composition for forming a film on the inner surface of a pipe through which chlorine-containing water passes, the film coating when cured absorbing or consuming no more than 1 part per million chlorine, the coating composition comprising:
   (A) an epoxy resin containing at least 90% by weight of a bisphenol glycidyl ether, the epoxy resin containing epoxy groups;
   (B) an aliphatic polyamine compound sufficient to provide 0.5 to 0.9 equivalent of active hydrogen per equivalent of the epoxy group of said epoxy resin;
   (C) about 3 to about 20 parts by weight per 100 parts by weight of the sum of components (A) and (B) of at least one member selected from the group consisting of 1-xylyl-1,3-diphenyl-butane, bis($\alpha$- methylbenzyl)xylene and 1-xylyl-1-(3-α-methylbenzylphenyl)ethane; and (D) at least one member selected from the group consisting of a coloring pigment and an inorganic filler.

2. The coating composition of claim 1 wherein the aliphatic polyamine compound (B) is a cyclic compound having at least one active hydrogen and at least one nitrogen atoms per molecule.

3. The coating composition of claim 1 wherein aliphatic polyamine compound (B) is at least one selected from the group consisting of isophoronediamine, m-xylylenediamine, cis-bis(p-aminocyclohexyl)methane, 1,3-aminomethylcyclohexane, and m-trimethylxylylenediamine.

4. The coating composition of claim 1 wherein component (A0 or component (A) diluted with component (C) has a viscosity of up to 5,000 centipoise at 25° C., and component (B) or component (B) diluted with component (C) has a viscoisty of up to 8,000 centipoise at 25° C.

5. The coating composition of claim 1 wherein said inorganic filler is flake stainless steel.

6. The coating composition of claim 5 wherein said flake stainless steel has been surface treated with stearic acid.

7. The coating composition of claim 5 wherein said flake stainless steel is present in an amount of about 5 to about 90 parts by weight per 100 parts by weight of the sum of components (A) and (B).

* * * * *